United States Patent
Xiong et al.

(10) Patent No.: US 9,933,905 B2
(45) Date of Patent: Apr. 3, 2018

(54) TOUCH-CONTROL DISPLAY PANEL

(71) Applicants: Xiamen Tianma Micro-electronics Co., Ltd., Xiamen (CN); Tianma Micro-electronics Co., Ltd., Shenzhen (CN)

(72) Inventors: Wenqiang Xiong, Xiamen (CN); Ying Zhang, Xiamen (CN); Jiancai Huang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 169 days.

(21) Appl. No.: 15/053,193

(22) Filed: Feb. 25, 2016

(65) Prior Publication Data

US 2017/0192557 A1    Jul. 6, 2017

(30) Foreign Application Priority Data

Dec. 31, 2015   (CN) .......................... 2015 1 1028060

(51) Int. Cl.
*G06F 3/044*   (2006.01)
*G06F 3/041*   (2006.01)

(52) U.S. Cl.
CPC ............ *G06F 3/044* (2013.01); *G06F 3/0412* (2013.01); *G06F 3/0416* (2013.01); *G06F 2203/04111* (2013.01)

(58) Field of Classification Search
CPC ......... G06F 2203/04111; G06F 3/0412; G06F 3/0416; G06F 3/044
See application file for complete search history.

(56) References Cited

U.S. PATENT DOCUMENTS

2014/0111450 A1* 4/2014 Lee .......................... G06F 3/044
                                                                  345/173
2016/0328056 A1* 11/2016 Lai .......................... G06F 3/044
(Continued)

FOREIGN PATENT DOCUMENTS

CN          101847071 A       9/2010
CN          103365461 A      10/2013
(Continued)

*Primary Examiner* — Dmitriy Bolotin
(74) *Attorney, Agent, or Firm* — Anova Law Group, PLLC

(57) ABSTRACT

A touch-control display panel includes a touch-control electrode including a plurality of first electrodes and a plurality of second electrode overlapping with the first electrodes in insulation, a plurality of cascaded first touch-control units selectively connected with the first electrodes, and a plurality of touch-control lines selectively connected with the second electrode. The first electrodes are stripe-shaped electrodes divided into a plurality of first electrode groups, each first electrode group including n first electrodes, with n being an integer and n≥2. The first electrodes in a first electrode group are connected to a same first touch-control unit, and each of the plurality of first touch-control units respectively transmits first touch-control signals to its corresponding first electrode group. The second electrodes are arranged in a plurality of rows and columns, and each row of the second electrodes overlapping at least one first electrode with insulation.

17 Claims, 5 Drawing Sheets

(56) References Cited

U.S. PATENT DOCUMENTS

2017/0075498 A1* 3/2017 Zhuang ................ G06F 3/0418
2017/0083149 A1* 3/2017 Lai ....................... G06F 3/0416
2017/0097727 A1* 4/2017 Wu ....................... G06F 3/0416
2017/0102821 A1* 4/2017 Lai ....................... G06F 3/0416

FOREIGN PATENT DOCUMENTS

| CN | 104503649 A | 4/2015 |
| CN | 104850287 A | 8/2015 |
| CN | 105045440 A | 11/2015 |
| KR | 101318448 B1 | 10/2013 |

* cited by examiner

TOUCH-CONTROL DISPLAY PANEL

CROSS-REFERENCES TO RELATED APPLICATIONS

This application claims priority of Chinese Patent Application No. 201511028060.5, filed on Dec. 31, 2015, the entire contents of which are hereby incorporated by reference.

FIELD OF THE INVENTION

The present disclosure generally relates to the field of display technologies and, more particularly, relates to a touch-control display panel.

BACKGROUND

With the continuous development of mobile terminal technology, display panels with touch-control functions have gradually become mainstream for various types of mobile terminals. Usually, an embedded touch-control structure may be used in a display terminal. That is, a touch-control function may be directly embedded inside a display panel to decrease the weight and thickness of the entire touch-control display panel.

For a mutual capacitance type embedded touch-control display panel commonly used in prior art technology, a display scanning circuit (Display VSR) and a touch-control scanning circuit (TP VSR) need to be concurrently deployed outside the touch-control display region of a touch-control display panel. Because these two types of circuits may occupy much space at the two sides of a panel frame, it is often difficult to make a touch-control display panel with a thin frame.

The disclosed structures are directed to solve one or more problems set forth above and other problems in the art.

BRIEF SUMMARY OF THE DISCLOSURE

One aspect of the present disclosure includes a touch-control display panel. The touch-control display panel includes a touch-control electrode including a plurality of first electrodes and a plurality of second electrode overlapping with the first electrodes in insulation, a plurality of cascaded first touch-control units selectively connected with the first electrodes, and a plurality of touch-control lines selectively connected with the second electrode. The first electrodes are stripe-shaped electrodes divided into a plurality of first electrode groups, each first electrode group including n first electrodes, with n being an integer and n≥2. The first electrodes in a first electrode group are connected to a same first touch-control unit, and each of the plurality of first touch-control units respectively transmits first touch-control signals to its corresponding first electrode group. The second electrodes are arranged in a plurality of rows and columns, each row of the second electrodes overlapping at least one first electrode with insulation, each second electrode in each row of the second electrodes is connected to a different second touch-control signal and, in each column of the second electrodes, second electrodes corresponding to the n first electrodes in a first electrode group are connected to different second touch-control signals.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
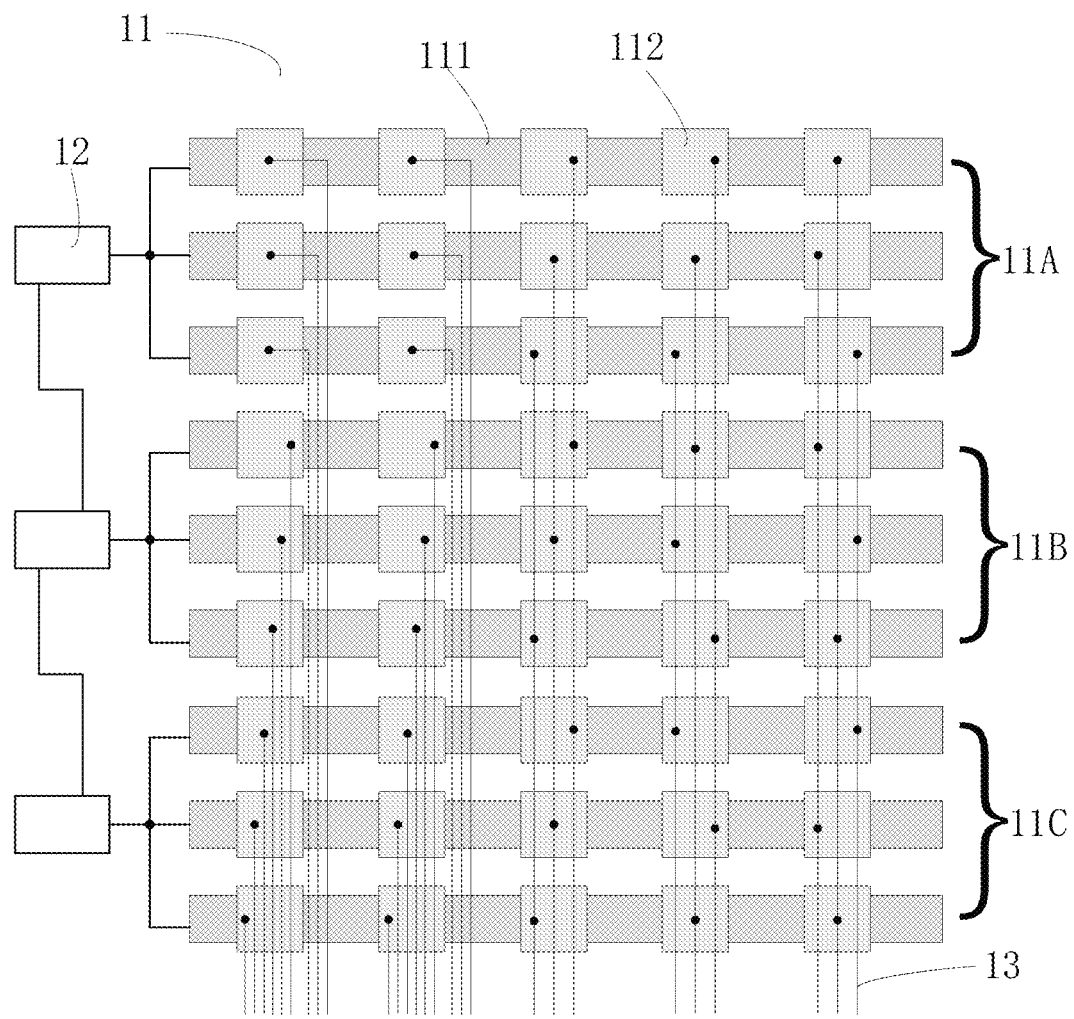
FIG. 1 illustrates a schematic structural view of an exemplary touch-control display panel consistent with the disclosed embodiments.

FIG. 1 illustrates a schematic structural view of an exemplary touch-control display panel. As shown in FIG. 1, the touch-control display panel comprises a touch-control electrode 11 and a plurality of cascaded first touch-control units 12. Other components may also be included.

The touch-control electrode 11 includes a plurality of first electrodes 111 and a plurality of second electrodes 112. The first electrodes 111 may be stripe-shaped electrodes, and the plurality of first electrodes 111 may be arranged with a space between any adjacent first electrodes 111. Further, the plurality of first electrodes 111 may be divided into a plurality of first electrode groups. A first electrode group includes n first electrodes, with n≥2, where n is an integer. In the exemplary touch-control display panel shown in FIG. 1, the touch-control electrode 11 includes nine first electrodes 111, and these nine first electrodes 111 may be divided into three first electrode groups, a first electrode group 11A, a first electrode group 11B, and a first electrode group 11C. Other numbers of electrodes and electrode groups may be included.

The first electrodes 111 in a first electrode group are connected to a same first touch-control unit 12. Each first touch-control unit 12 transmits a first touch-control signal to its corresponding first electrode group. That is, the first electrodes 111 in the first electrode group 11A are connected to a same first touch-control unit 12, and the first touch-control unit 12 may transmit a first touch-control signal to each first electrode 111 in the first electrode group 11A. Similarly, first electrode group 11B and first electrode group 11C may be respectively connected to two other first touch-control units 12, and may respectively receive different first touch-control signals through these two first touch-control units 12.

A plurality of first touch-control units 12 may be placed at a first side or a second side of a touch-control electrode 11, wherein the first side and the second side are two opposite sides of the touch-control electrode 11. For example, if the first side is the left side of a touch-control electrode 11, the second side is the right side of the touch-control electrode 11. In the present embodiment, three first touch-control units 12 of the touch-control display panel are placed at the left side of the touch-control electrode 11. Other numbers of the first touch-control units 12 may be included.

The plurality of second electrodes 112 are arranged in a plurality of rows and a plurality of columns, e.g., an array, etc. Each row of second electrodes 112 overlap at least one first electrode 111 in an insulated way. That is, each row of second electrodes 112 may overlap one or more first electrodes 111 in an insulated way. In the touch-control display panel shown in FIG. 1, the second electrodes 112 are arranged in a matrix with nine rows and five columns, and each row of second electrodes 112 overlap one first electrode 111 in an electrically-insulated way.

Each second electrode 112 in a same row is connected to a different second touch-control signal. In the touch-control display panel shown in FIG. 1, each second electrode 112 in a same row is connected to a different second touch-control line 13, and each second touch-control line 13 is connected to a different touch-control signal. Therefore, in each row of second electrodes 112, each second electrode 112 corresponds to a different second touch-control signal.

In the second electrodes 112 in a same column, the n second electrodes 112 corresponding to the n first electrodes 111 in a first electrode group are connected to different second touch-control signals. As shown in FIG. 1, in a same column of second electrodes 112, the three second electrodes 112 corresponding to the three first electrodes 111 in a first electrode group are connected to different second touch-control signals.

In one embodiment, in each column of second electrodes 112, the second electrodes 112 corresponding to different first electrode groups may be connected to different second touch-control signals through different second touch-control lines 13. As shown in FIG. 1, in the first column and the second column of second electrodes 112, each second electrode 112 in a same column may be connected to a different second touch-control line 13, and thus connected to a different second touch-control signal through the second touch-control line 13 connected to the second electrode 112.

In another embodiment, in each column of second electrodes 112, second electrodes 112 corresponding to different first electrode groups may be connected to a same second touch-control signal through a same second touch-control line 13. In a same column of second electrodes 112, the three second electrodes 112 corresponding to a first electrode group are called first second electrode 112, second second electrode 112 and third second electrode 112, respectively.

As shown in FIG. 1, in the third column of second electrodes 112, corresponding to the first electrode groups 11A, 11B and 11C, the three first second electrodes 112, the three second second electrodes 112 and the three third second electrodes 112 may be, respectively, connected to a same touch-control signal through a same second touch line 13. That is, in the third column of second electrodes 112, the second electrodes 112 at the first, fourth, and seventh rows may be connected to a same second touch-control line 13; the second electrodes 112 at the second, fifth, and eighth rows may be connected to another second contact control line 13; and the second electrodes 112 at the third, sixth, and ninth rows may be connected to another second touch-control line. That is, the second electrode 112 at the same position of the first electrode 111 among the first electrode groups may be connected together by the same second touch line 13. Each second touch-control line 13 is connected to a second touch-control signal.

As shown in FIG. 1, for the fourth column and the fifth column of second electrodes 112, the specific methods for connecting second electrodes 112 and second touch-control lines 13 are slightly different. However, in each of these connection methods, three second electrodes 112 corresponding to three different first electrode groups are selected from a same column of second electrodes 112, and are connected to a same second touch line 13. Therefore, in the fourth column and the fifth column of second electrodes 112, the second electrodes 112 corresponding to different first electrode groups are connected to a same second touch-control signal through a second touch-control line 13.

In the present exemplary touch-control display panel, in each column, the methods for connecting second electrodes 112 and second touch-control lines 13 may be the same, and may be different. The present exemplary touch-control display panel does not limit the specific methods for connecting second electrodes and second touch-control lines. It is within the protection scope of the present application as long as the n second electrodes corresponding to the n first electrodes in a first electrode group are connected to different second touch-control signals.

Figure 2:
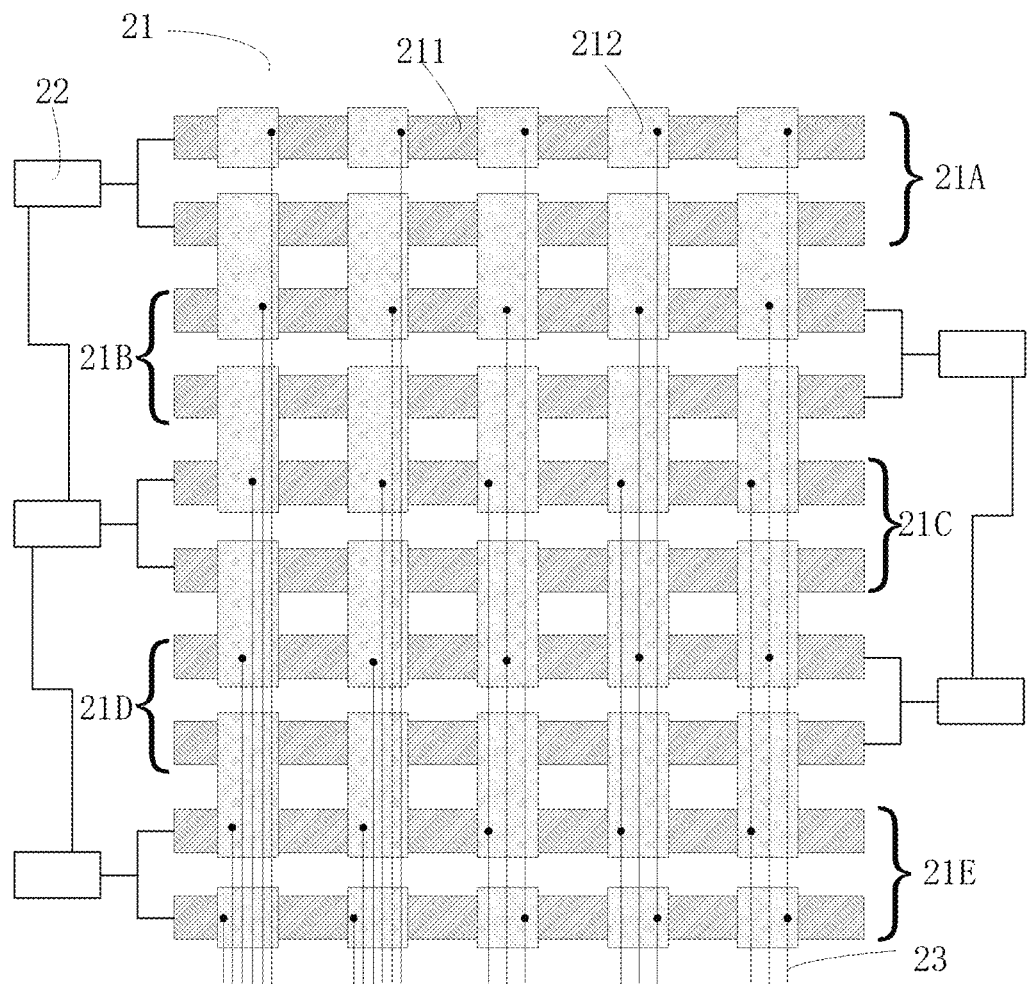
FIG. 2 illustrates a schematic structural view of another exemplary touch-control display panel consistent with the disclosed embodiments.

FIG. 2 illustrates a schematic structural view of another exemplary touch-control display panel. As shown in FIG. 2, the present exemplary touch-control display panel comprises a touch-control electrode 21 and five first touch-control units 22. The touch-control electrode 21 includes ten first electrodes 211 and a plurality of second electrodes 212 arranged in six rows and five columns. Other numbers of first electrodes and second electrodes may be included.

The ten first electrodes 211 may be divided into five first electrode groups, namely 21A, 21B, 21C, 21D and 21E. Each first electrode group includes two first electrodes 211, and these two first electrodes 211 are connected to a same first touch-control unit 22.

The plurality of first touch-control units 22 may be placed at the first side and the second side of the touch-control electrode 21, i.e., the two opposite sides of the touch-control electrode 21. In one embodiment, the five first touch-control units 22 may be placed at the left side and the right side of the touch-control electrode 21. Specifically, the three cascaded touch-control units 22 may be placed at the left side of the touch electrode 21, for sequentially driving first electrode groups 21A, 21C and 21E; and the two cascaded touch-control units 22 may be placed at the right side of the touch-control electrode 21 for sequentially driving the first electrode groups 21B and 21D.

In the touch-control stage of the present touch-control display panel, the cascaded first touch-control units 22 located at the left side of the touch-control electrode 21 drive the first electrode group 21A first; then the cascaded first touch-control units 22 located at the right side of the touch-control electrode 21 drive the first electrode group 21B; and then the cascaded first touch-control units 22 located at the left side of the touch-control electrode 21 drive the first electrode group 21C. That is, the touch-control units from different sides may drive the first electrode groups alternatingly. In this way, through the stepwise driving of the first touch-control units until the first electrode group 21E is driven, the touch-control driving scan on the entire touch-control display panel may be realized.

One difference between the present embodiment and the touch-control display panel shown in FIG. 1 is that, in the present embodiment, at least one row of second electrodes 212 may overlap a plurality of first electrodes 211 at different first electrode groups in an insulated way. Specifically, as shown in FIG. 2, in the present embodiment, the second electrodes 212 in the second, third, fourth, and fifth rows may overlap two first electrodes 211 at different groups in an insulated way.

In the present embodiment, the method for connecting second electrodes 212 and second touch-control signals is similar to the method for connecting second electrodes 212 and second touch-control signals in the touch-control display panel shown in FIG. 1. That is, in a same column of second electrodes 212, the two second electrodes 212 corresponding to the two first electrodes 211 in a first electrode group are connected to different second touch-control signals. Specifically, as shown in FIG. 2, for the first column and the second column of second electrodes 212, each second electrode 212 in a same column of second electrode 212 may be connected to a different second touch-control signal through a different touch-control line 23. Meanwhile, as shown in FIG. 2, for the second electrodes 212 in the third, fourth, and fifth columns of second electrodes, in a same column of second electrodes 212, the second electrodes 212 corresponding to different first electrode groups may be connected to a same second touch-control signal through a same second touch-control line 23.

Figure 3:
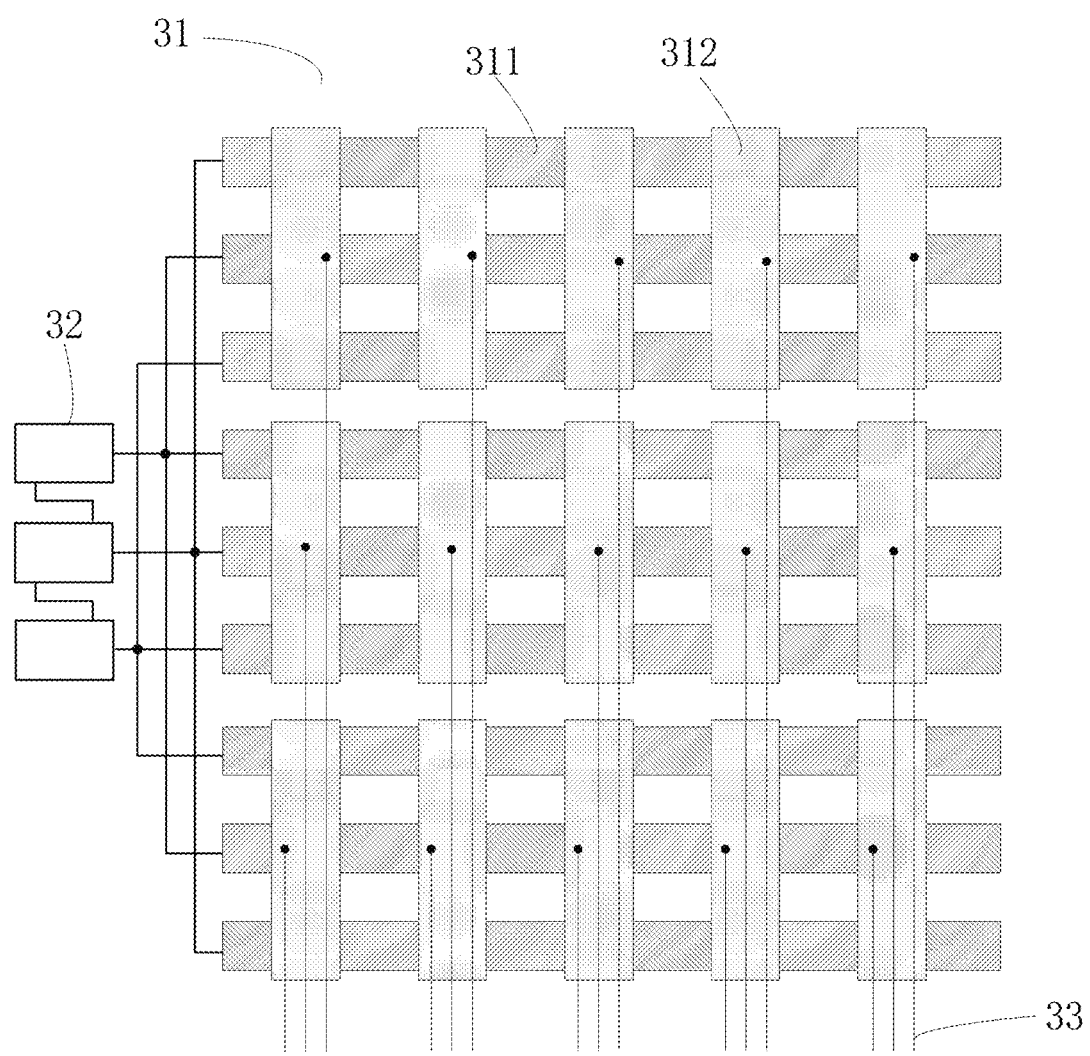
FIG. 3 illustrates a schematic structural view of another exemplary touch-control display panel consistent with the disclosed embodiments.

FIG. 3 illustrates a schematic structural view of another exemplary touch display panel. As shown in FIG. 3, the touch-control display panel comprises a touch-control electrode 31 and three cascaded first touch-control units 32. The touch-control electrode 31 includes nine first electrodes 311, divided into three first electrode groups, and fifteen second electrodes 312 arranged in three rows and five columns.

One difference between the present embodiment and the touch-control display panels shown in FIG. 1 and FIG. 2 is that, in the touch-control display panels shown in FIG. 1 and FIG. 2, the first electrodes in each first electrode group are arranged in order, whereas in the present embodiment, the first electrodes 311 at different first electrode groups are arranged in an intermingled way. Specifically, as shown in FIG. 3, the nine first electrodes 311 may be divided into three first electrode groups. These three first electrode groups may include, respectively, the first electrodes 311 in the second, fourth, and eighth rows, the first electrodes 311 in the first, fifth, and ninth rows, and the first electrodes 311 in the third, sixth, and seventh rows. That is, each first electrode group may include one first electrode from every three (or whatever number of the touch-control units) sequentially-arranged first electrodes. For example, another arrangement may include three first electrode groups having, respectively, the first electrodes 311 in the first, fourth, and seventh rows, the first electrodes 311 in the second, fifth, and eighth rows, and the first electrodes 311 in the third, sixth, and ninth rows, etc.

The first electrodes 311 in a first electrode group may be connected to a same first touch-control unit 32, and each first electrode group may be connected to a different first touch-control unit 32. In the present embodiment, the plurality of first touch-control units 32 may be placed at the right side of the touch-control electrode 31.

Further, in the present exemplary touch-control display panel, each row of second electrodes 312 can overlap, in an insulated way, three first electrodes 311 in different first electrode groups. Each of the second electrodes 312 in a same column is connected to a different second touch-control signal through a different second touch-control line 33.

It should be noted that the specific order of the intermingled arrangement of the first electrodes in different first electrode groups may be made according to actual needs, without limiting the scope of the disclosed embodiments.

It may be seen from the three exemplary embodiments shown in FIG. 1, FIG. 2, and FIG. 3 that, though each touch-control display panel may have a different structure, the plurality of first electrodes in each touch-control display panel may be connected to a same touch-control unit, and in each column of second electrodes, a plurality of second electrodes corresponding to the first electrodes in a same first electrode group may be connected to different second touch-control signals. Thus, a first electrode driven by a touch-control unit may be identified through a second touch-control signal, so as to achieve a touch-control function. Compared to the prior art in which each first electrode needs to be connected to a different touch-control unit, the number of touch-control units of the present embodiment may be substantially reduced. Therefore, the present embodiment may obviously save the frame space of a touch-control display panel, and it is thereby easier to make a touch-control display panel with a thin frame.

Figure 4:
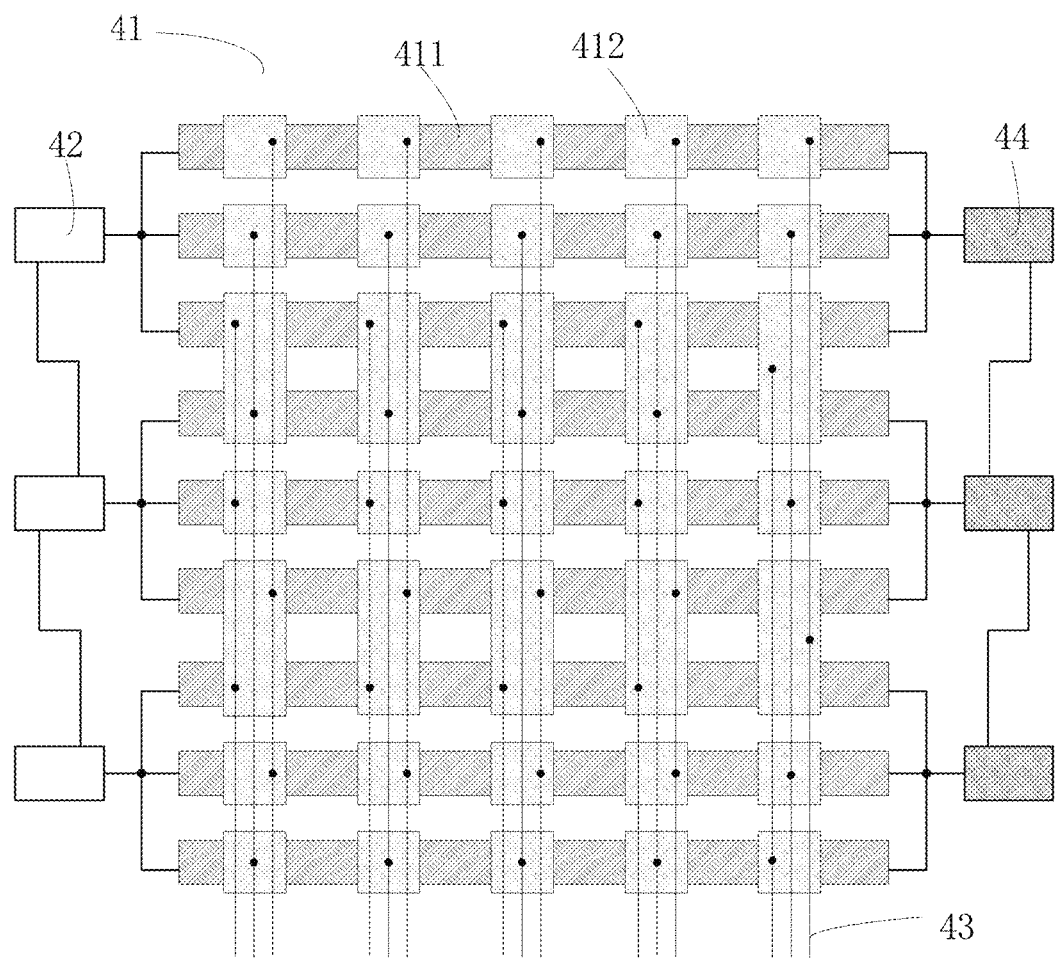
FIG. 4 illustrates a schematic structural view of another exemplary touch-control display panel consistent with the disclosed embodiments.

FIG. 4 illustrates a schematic structural view of another exemplary touch-control display panel. As shown in FIG. 4, the exemplary touch-control display panel comprises a touch-control electrode 41 and three cascaded touch-control units 42. The touch-control electrode 41 includes nine first electrodes 411 and a plurality of second electrodes 412 arranged in seven rows and five columns. The first electrodes 411 can be divided into three first electrode groups. Each first electrode group includes three first electrodes 411, and the three first electrodes 411 are connected to a same first touch-control unit 42.

In the present embodiment, the second electrodes 412 located at the third row and the fifth row overlap, respectively, two first electrodes 411 in different groups in an insulated way. The second electrodes 412 located at other rows overlap, respectively, one first electrode 411 in an insulated way. In the second electrodes 412 located in a same column, the second electrodes 412 corresponding to the first electrodes in different first electrode groups may be connected to a same second touch-control signal through a same second touch-control line 43.

The three cascaded first touch-control units 42 may be placed at the left side of the touch-control electrode 41. In some alternative implementations, a touch-control display panel may further comprise a plurality of cascaded second touch-control units 44. Specifically, in the present embodiment, the touch-control display panel may also comprise three cascaded second touch-control units 44, and the three second touch-control units 44 may be placed at the right side of the touch-control electrode 41. The first electrodes 411 in a first electrode group may be connected to a same second touch-control unit 44, and each first electrode group is connected to a different second touch-control unit 44. That is, a first electrode group may be concurrently connected to a first touch-control unit 42 and a second touch-control unit 44. Thus, a first touch-control unit 42 and a second touch-control unit 44 may together transmit first touch-control signals to a corresponding first electrode group.

Thus, in the present exemplary touch-control display panel, two sets of touch-control units are placed at two opposite sides of a touch-control electrode. The touch-control electrode may be driven by the touch-control units at the two sides of the touch-control electrode, and thus the driving ability to the touch-control electrode is enhanced.

Figure 5:
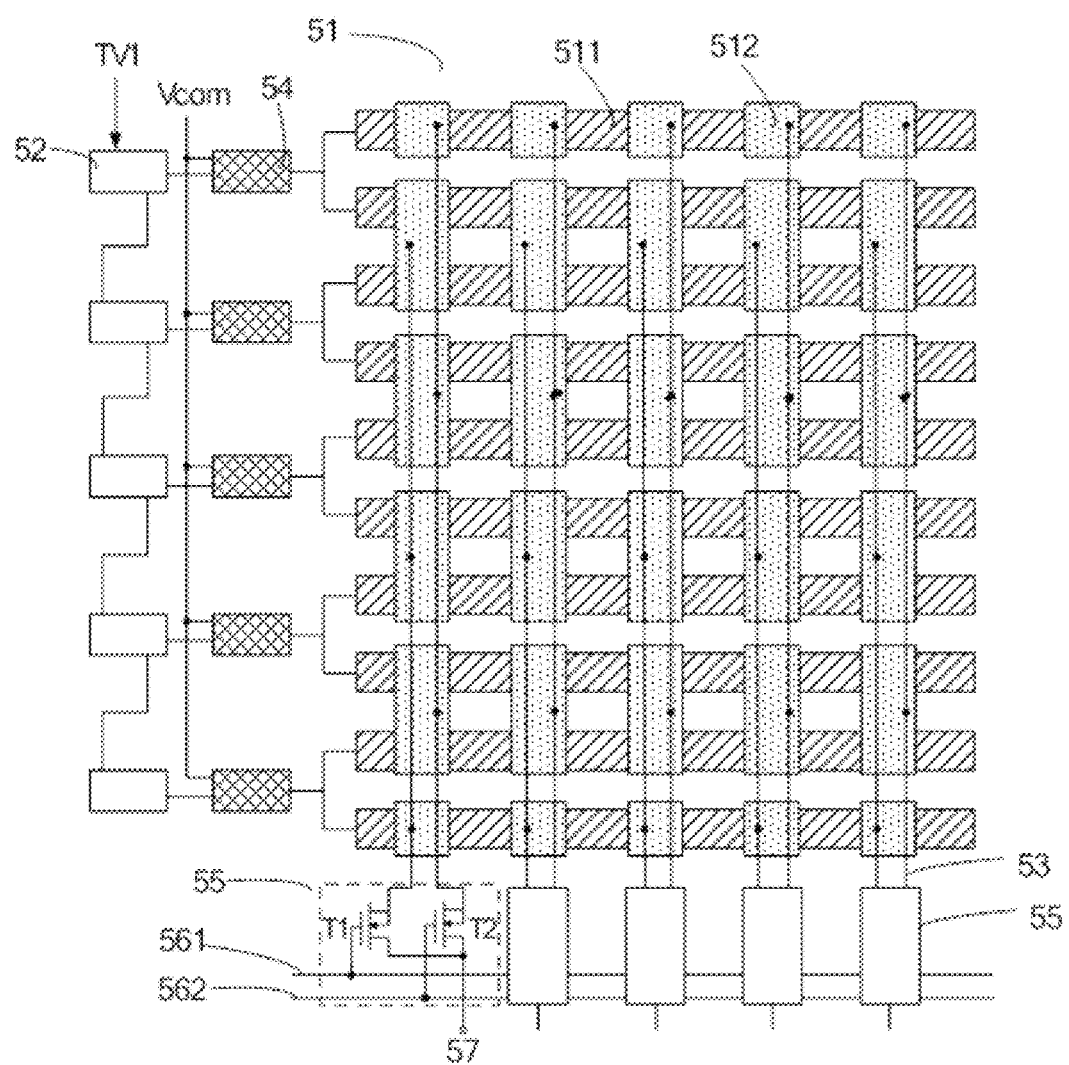
FIG. 5 illustrates a schematic structural view of another exemplary touch-control display panel consistent with the disclosed embodiments.

FIG. 5 illustrates a schematic structural view of another exemplary touch-control display panel. As shown in FIG. 5, the exemplary touch-control display panel comprises a touch-control electrode 51 and five cascaded first touch-control units 52. The touch-control electrode 51 includes ten first electrodes 511 and a plurality of second electrodes 512 arranged in six rows and five columns. The ten first electrodes 511 may be divided into five first electrode groups, and each first electrode group includes two first electrodes 511.

The first touch-control units 52 may be placed at the left side of the touch-control electrode 51. In some alternative implementations of the present embodiment, a plurality of first electrodes 511 may also be used as common electrodes for display. That is, in the touch-control stage of a touch-control display panel, a plurality of first electrodes 511 may be used as touch-control electrodes, for example, driving electrodes for measuring mutual capacitance; and in the display stage of a touch-control display panel, a plurality of first electrodes 511 may be used as common electrodes for providing common voltage signals to display pixels.

Each first touch-control unit 52 may also include an output selection unit 54. The output selection unit 54 may output a first touch-control signal TV1 or a common voltage signal Vcom in a time-multiplexed way. Specifically, in the touch-control stage of a touch-control display panel, the output selection unit 54 may output a first touch-control signal TV1 provided by a first touch-control unit 52; and in the display stage of a touch-control display panel, the output selection unit 54 may output a common voltage signal Vcom.

In some alternative implementations, a touch-control display panel may include a first substrate and a second substrate that are oppositely placed (not shown). The first electrodes 511 and the second electrodes 512 may be configured on the first substrate and the second substrate, respectively. Alternatively, the first substrate may be a thin film transistor substrate, and the second substrate may be a color filter substrate.

In the present embodiment, at least one row of second electrodes 512 may overlap a plurality of first electrodes 511 in different groups in an insulated way. Specifically, the second electrodes 512 in the second, third, fourth and fifth rows, may overlap first electrodes 511 in two different groups in an insulated way. Two second touch-control signal lines 53 corresponding to the second electrodes 512 in a same column are deployed. In the second electrodes 512 in a same column, the two second electrodes 512 corresponding to one first electrode group are connected to different second touch-control signals through different second touch-control signal lines 53. Meanwhile, the plurality of second electrodes 512 corresponding to the first electrodes in different first electrode groups may be connected to a same second touch-control signal line 53. For example, as shown in FIG. 5, in a same column, the three second electrodes 512 at odd rows are connected to a same second touch-control signal line 53, and the three second electrodes 512 at even rows are also connected to a same second touch-control signal line 53.

In some alternative implementations of the present embodiment, a multiplexer unit 55 corresponding to a column of second electrodes 512 may be deployed. A multiplexer unit 55 may include a plurality of thin film transistor switches. As shown in FIG. 5, the multiplexer unit 55 corresponding to the first column of second electrodes 512 comprises two thin film transistor switches T1 and T2. The control terminal of each thin film transistor switch is connected to a control line, the input terminal of each thin film transistor is connected to a second touch-control signal line 53, and the output terminals of the two thin film transistors T1 and T2 are connected to a same second touch-control signal pin 57.

The control terminals of thin film transistors T1 and T2 are connected to different control lines. The control terminal of thin film transistor T1 is connected to control line 561, and the control terminal of thin film transistor T2 is connected to control line 562. The control lines 561 and 562 may control thin film transistors T1 and T2 to be turned on at different time. When any one of the thin film transistors T1 and T2 is turned on, the second touch-control signal may be transmitted to the corresponding second touch-control signal pin 57 from a second touch-control signal line 53 through the input terminal and output terminal of the thin film transistor.

In some alternative implementations of the present embodiment, the plurality of multiplexer units 55 corresponding to second electrodes 512 in different columns share a plurality of control lines. As shown in FIG. 5, the specific structures (not shown) of the multiplexer units 55 corresponding to the second, third, fourth and fifth columns, may be the same as the specific structure of the multiplexer unit 55 corresponding to the first column. These five multiplexer units 55 corresponding to different columns of second electrodes 512 may share control lines 561 and 562.

In the present embodiment, in the touch-control stage of the touch-control display panel, a touch location may be determined by measuring the mutual capacitance signal value between a first electrode 511 and its corresponding second electrode 512. Specifically, an excitation signal, for example, a pulse signal, may be sequentially applied to the first electrodes 511 in each first electrode group by a plurality of cascaded first touch-control unit 52. At the same time, sensing signals may be received from the second electrodes 512 through second touch-control signal lines 53.

Each time, a first control unit 52 may concurrently apply a same excitation signal to the first electrodes in a first electrode group. However, because the two second electrodes 512 corresponding to the first electrodes in a first electrode group are connected to different second touch-control signal lines 53, the sensing signal generated on each second electrode 512 may still be separately measured, wherein the sensing signal is the mutual capacitance signal between a second electrode 512 and its corresponding first electrode 511. When a finger approaches a touch-control display panel, the partial capacity at the place of the finger decreases. Based on the position of capacitance change in the entire touch-control display panel, the coordinates of the touch point, i.e., the finger touch position, may be obtained.

In the present exemplary touch-control display panel, a multiplexer unit may be further deployed for each column of second electrodes, and the conduction of a second touch-control signal line may be controlled through a control line, and thus the touch-control signal of one of the second electrodes in a same column may be obtained. By deploying multiplexer units, the number of second touch-control signal pins may be significantly reduced.

In some alternative implementations of the present embodiment, when a first touch-control unit 52 applies a first touch-control signal to a first electrode group 511, the first touch-control unit 52 may control the film transistors T1 and T2 to be concurrently turned on, so as to concurrently receive the second touch-control signals of the two second electrodes 512 corresponding to the first electrode group. In this case, a first electrode group may serve as a driving electrode, and the two second electrodes 512 corresponding to the first electrode group may serve as a sensing electrode. That is, the configurations of the first electrodes and the second electrodes are such that, when a first electrode group (i.e., the first electrodes in the first electrode group) is being driven or scanned, the second electrodes corresponding to the first electrode group can be selected to uniquely identify the specific first electrode in the first electrode group. This allows flexible control on the scanning accuracy of touch-control, so as to improve the detection efficiency of touch-control by reducing the scanning accuracy of touch-control.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A touch-control display panel, comprising:
   a touch-control electrode including a plurality of first electrodes and a plurality of second electrode overlapping with the first electrodes in insulation;
   a plurality of cascaded first touch-control units selectively connected with the first electrodes; and
   a plurality of touch-control lines selectively connected with the second electrode,
   wherein:
   the first electrodes are stripe-shaped electrodes divided into a plurality of first electrode groups, each first electrode group including n first electrodes, with n being an integer and n≥2;
   the first electrodes in a first electrode group are connected to a same first touch-control unit, and each of the plurality of first touch-control units respectively transmits first touch-control signals to its corresponding first electrode group; and
   the second electrodes are arranged in a plurality of rows and columns, each row of the second electrodes overlapping at least one first electrode with insulation, each second electrode in each row of the second electrodes is connected to a different second touch-control signal and, in each column of the second electrodes, second electrodes corresponding to the n first electrodes in a first electrode group are connected to different second touch-control signals.

2. The touch-control display panel according to claim 1, wherein each row of the second electrodes overlap one first electrode with insulation.

3. The touch-control display panel according to claim 2, wherein, in each column of the second electrodes, second electrodes corresponding to different first electrode groups are connected to a same second touch-control signal through a same touch-control line.

4. The touch-control display panel according to claim 2, wherein, in each column of the second electrodes, second electrodes corresponding to different first electrode groups are connected to different second touch-control signals through different touch-control lines.

5. The touch-control display panel according to claim 1, wherein at least one row of the second electrodes overlap first electrodes in different first electrode groups with insulation.

6. The touch-control display panel according to claim 1, wherein the first electrodes in each first electrode group are arranged in order.

7. The touch-control display panel according to claim 1, wherein the first electrodes at different first electrode groups are arranged in an intermingled way.

8. The touch-control display panel according to claim 1, wherein the plurality of first touch-control units are placed at a first side or a second side of the touch-control electrode, and the first side and the second side are two opposite sides of the touch-control electrode.

9. The touch-control display panel according to claim 8, further comprising a plurality of cascaded second touch-control units placed at a different side from the first touch-control units.

10. The touch-control display panel according to claim 9, wherein:
    first electrodes in a first electrode group are connected to a same second touch-control unit and a same first touch-control unit; and
    the first touch-control unit and the second touch-control unit together transmit the first touch-control signals to the corresponding first electrodes in the first electrode group.

11. The touch-control display panel according to claim 1, wherein the plurality of first touch-control units are placed at both a first side and a second side of the touch-control electrode, and the first side and the second side are two opposite sides of the touch-control electrode.

12. The touch-control display panel according to claim 1, wherein:
    the first electrodes are also used as common electrodes for display; and
    each first touch-control unit further includes an output selection unit for outputting a first touch-control signal or a common voltage signal in a time-multiplexed way.

13. The touch-control display panel according to claim 1, wherein:
    the touch-control signal lines are deployed corresponding to each column of the second electrodes; and
    in each column of the second electrodes, second electrodes corresponding to one first electrode group are connected to different second touch-control signals through different touch-control signal lines.

14. The touch-control display panel according to claim 13, wherein second electrodes corresponding to different first electrode groups are connected to a same touch-control signal line.

15. The touch-control display panel according to claim 13, further comprising a multiplexer unit corresponding to each column of the second electrodes,
    wherein:
    the multiplexer unit includes multiple thin film transistor switches, a control terminal of each thin film transistor switch connected to a control line; an input terminal of each thin film transistor connected to a touch-control signal line; and output terminals of the multiple thin film transistors connected to a same touch-control signal line pin;
    the control terminals of the thin film transistors are connected to different control lines; the control lines control the thin film transistors to be turned on at different time; and when a thin film transistor is turned on, a second touch-control signal is transmitted from the input terminal of the thin film transistor to a corresponding touch-control signal line pin through the output terminal of the thin film transistor.

16. The touch-control display panel according to claim 15, wherein multiple multiplexer units corresponding to different columns of the second electrodes share the control lines.

17. The touch-control display panel according to claim 1, further comprising a first substrate and a second substrate that are oppositely placed against the first substrate, wherein the first electrodes and the second electrodes are disposed on the first substrate and the second substrate, respectively.

* * * * *